United States Patent
Tomasi et al.

(10) Patent No.: US 9,321,519 B2
(45) Date of Patent: Apr. 26, 2016

(54) SUPPORT PLATE FOR THE PASSAGE OF SYSTEMS BETWEEN TWO ZONES WITH DIFFERENT PRESSURIZATIONS OF AN AIRCRAFT

(71) Applicant: Airbus Operations (SAS), Toulouse (FR)

(72) Inventors: Marc Tomasi, Toulouse (FR); Patrick Lieven, Fronton (FR); Romain Delahaye, Colomiers (FR); Matthieu De Kergommeaux, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 14/285,787

(22) Filed: May 23, 2014

(65) Prior Publication Data
US 2014/0346276 A1    Nov. 27, 2014

(30) Foreign Application Priority Data

May 24, 2013  (FR) ...................................... 13 54674

(51) Int. Cl.
*B64C 1/10* (2006.01)
*F16L 3/00* (2006.01)
*F16L 5/12* (2006.01)

(52) U.S. Cl.
CPC ... *B64C 1/10* (2013.01); *F16L 3/00* (2013.01); *F16L 5/12* (2013.01)

(58) Field of Classification Search
CPC .................................. B64C 1/10; B64C 1/406
See application file for complete search history.

(56) References Cited

U.S. PATENT DOCUMENTS

| | | | | |
|---|---|---|---|---|
| 4,684,190 | A * | 8/1987 | Clark et al. | 439/587 |
| 4,921,437 | A * | 5/1990 | Cooper et al. | 439/275 |
| 5,823,484 | A | 10/1998 | Barnard et al. | |
| 6,029,933 | A | 2/2000 | Holman et al. | |
| 6,378,805 | B1 | 4/2002 | Stephan et al. | |
| 7,730,680 | B2 * | 6/2010 | Holman et al. | 52/210 |
| 8,628,091 | B2 * | 1/2014 | Davison | 277/314 |
| 2011/0204184 | A1 | 8/2011 | Blanchard et al. | |

FOREIGN PATENT DOCUMENTS

| | | |
|---|---|---|
| EP | 0894709 | 2/1999 |
| EP | 2361829 | 8/2011 |
| WO | 9924316 | 5/1999 |

OTHER PUBLICATIONS

French Search Report, Feb. 4, 2014.

* cited by examiner

*Primary Examiner* — Tien Dinh
*Assistant Examiner* — Richard R Green
(74) *Attorney, Agent, or Firm* — Greer, Burns & Crain, Ltd.

(57) ABSTRACT

A support plate for the passage of systems between two zones at different pressurizations of an aircraft, in the region of a bulkhead separating the two zones. The support plate comprises a connection plate including at least one retaining element and at least one sealing joint and is provided with a plurality of holes intended for the passage of an assembly of systems which have to pass through said bulkhead.

8 Claims, 2 Drawing Sheets

SUPPORT PLATE FOR THE PASSAGE OF SYSTEMS BETWEEN TWO ZONES WITH DIFFERENT PRESSURIZATIONS OF AN AIRCRAFT

CROSS-REFERENCES TO RELATED APPLICATIONS

This application claims the benefit of the French patent application No. 1354674 filed on May 24, 2013, the entire disclosures of which are incorporated herein by way of reference.

BACKGROUND OF THE INVENTION

The present invention relates to a support plate for the passage of systems (electrical, hydraulic, etc.) between two zones with different pressurizations of an aircraft.

On aircraft, in particular on transport airplanes, for the circulation in particular of electrical current or of fluid between two zones of the aircraft exhibiting different pressurizations, in particular from a pressurized zone to a non-pressurized zone (for example from the wings to the central fuselage), each type of system present (electrical, hydraulic, etc.) necessitates a dedicated support (or pressure) plate, which is mounted in the bulkhead (or wall) separating the two zones.

Such a support plate is provided with a plurality of holes, in which are arranged sleeves provided at the ends with connection means intended to produce connections on each side of the plate in order to enable circulation, for example electrical or hydraulic circulation. This support plate also comprises fixing means, generally a large number thereof, intended to produce solid fixing of this support (or pressure) plate to the structure of the aircraft. In addition, the opening provided in the structure in which the support plate is arranged should be reinforced locally in order not to have an adverse effect on the mechanical behavior of the structure/plate assembly.

Conventionally, such a support plate is intended solely for a single type of system (for example, a support plate for the electrical connections; a support plate for the hydraulic connections, etc.).

This conventional solution has an adverse effect in terms of mass (the plates are heavy) and space required (the holes and the plates must comply with minimum dimensions, and the openings created in the primary structure must not be too close to one another in order not to risk impairing the mechanical behavior of the structure).

As there are often a large number of systems passing through a bulkhead between two zones at different pressurizations, the impact in terms of mass and of connection surface of this conventional solution therefore has an adverse effect.

SUMMARY OF THE INVENTION

The present invention relates to a support plate for the passage of systems (electrical, hydraulic, etc.) between two zones at different pressurizations of an aircraft, in the region of a bulkhead separating the two zones which makes it possible to remedy the adverse impact of the conventional solution.

To this end, according to the invention said support plate comprising a connection plate is remarkable in that said connection plate includes at least one retaining element and at least one sealing joint arranged on the periphery of at least one face of the connection plate, said connection plate being also provided with a plurality of holes intended for the passage of an assembly of (different) systems passing through said bulkhead.

Thus by virtue of the invention, most of the connections (and preferably all of the connections) are arranged on one and the same support plate of the aircraft, which generates a reduction of the overall connection surface and likewise a reduction of the overall mass. Thus the present invention makes it possible to remedy the aforementioned negative impact.

Furthermore, said support plate may present at least some of the following characteristics, taken individually or in combination:

said retaining element is provided with two branches, of which one is intended to come into contact with a face of the connection plate and of which the other is suitable for being fixed on a structural element;

said sealing joint is arranged at least on the face of the connection plate which is subject to the lower pressure;

said sealing joint has a U-shaped cross-section;

said sealing joint is integrated in the connection plate;

it is provided with connectors arranged in such a way as to pass through said holes in the connection plate; and the connection plate has the shape of a right-angled triangle with rounded summits or corners and a side opposite the right angle corner which is slightly curved with a convex shape.

The present invention likewise relates to a bulkhead (or wall) separating two zones at different pressurizations on an aircraft, this bulkhead being provided with a support plate as aforementioned.

Advantageously, said support plate includes at least one retaining element which is fixed by one of its branches to a structural element which is rigidly connected to the bulkhead (that is to say which is fixed to or integrated with the bulkhead). Preferably, said structural element is a base of which the internal periphery is adapted to the external periphery of said connection plate so as to allow sliding thereof with optionally a peripheral contact, during mounting or removal.

The present invention also relates to an aircraft, in particular a transport airplane, which comprises at least one support plate and/or a separating bulkhead, such as those mentioned above.

BRIEF DESCRIPTION OF THE DRAWINGS

The figures of the appended drawings will enable a good understanding of how the invention can be produced. In these drawings, identical references designate similar elements.

DETAILED DESCRIPTION OF THE PREFERRED EMBODIMENTS

Figure 1:
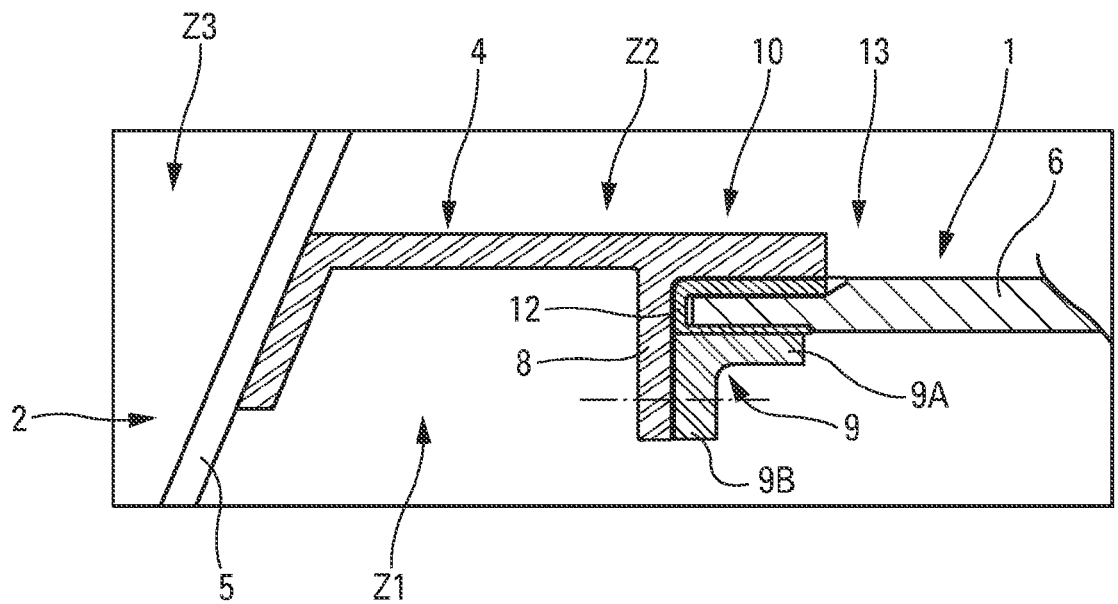
FIG. 1 is a partial schematic cross-section showing the arrangement of a support plate in an aircraft.
Figure 4:
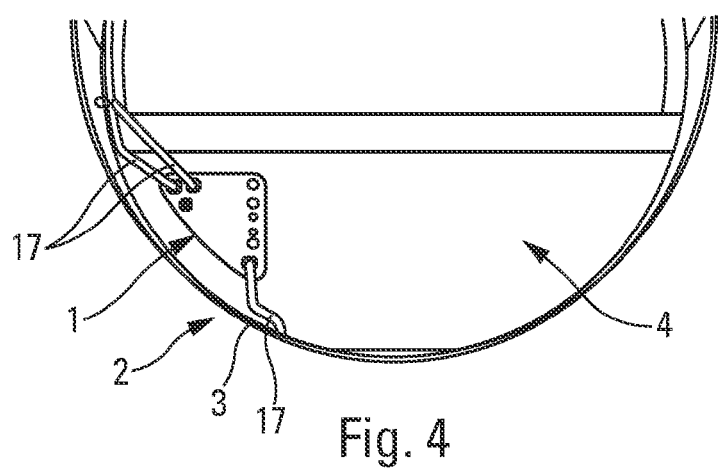
FIG. 4 shows an example of the installation of a support plate on an aircraft.

The support plate 1 which enables illustration of the invention and is shown schematically and partially in a mounting position in FIG. 1 is intended to be arranged on an aircraft 2, in particular a transport airplane, of which a fuselage portion 3 is shown in FIG. 4.

Conventionally, this support plate 1 is intended to enable the passage of conventional electrical and mechanical systems, for example a cooling system or an electrical power supply system, between two zones Z1 and Z2 of the aircraft 2 which are subjected to different pressurizations, for example between a wing and the central fuselage of the aircraft 2.

The present invention also relates to a bulkhead 4 for separating two zones Z1 and Z2 at different pressurizations of the aircraft 2, and preferably between a pressurized zone Z1 and a non-pressurized zone Z2, as shown in FIG. 1. FIG. 1 likewise shows a portion of the skin 5 of the fuselage of the aircraft 2, which make it possible to locate a zone Z3 outside the aircraft 2. This bulkhead 4 is provided with a support plate 1.

Conventionally, said support plate 1 comprises a connection (or interface) plate 6 provided with through holes 7 (FIG. 3), in which conventional connectors 16, specified below, are arranged.

According to the invention, said connection plate 6 includes a plurality of holes 7 which are intended for an assembly of a plurality of electrical and mechanical systems passing through the bulkhead 4, and preferably for all the electrical and mechanical systems passing through said bulkhead 4.

This connection plate 6 has large dimensions (relative to a conventional plate), thus offering a large surface to receive all the systems which are to connect the two zones Z1 and Z2. This results in a reduction of the necessary overall connection surface in the region of the bulkhead 4 and thus a reduction of the overall mass (which is limited to that of the single support plate 1).

By virtue of the invention, therefore, a single passage zone is used in order to support most (or preferably all) of the electrical and mechanical systems (hydraulic, liquid cooled, etc.) present, by arranging all the necessary connections on one and the same plate 1, which moreover is independent of the aircraft 2.

Figure 2:
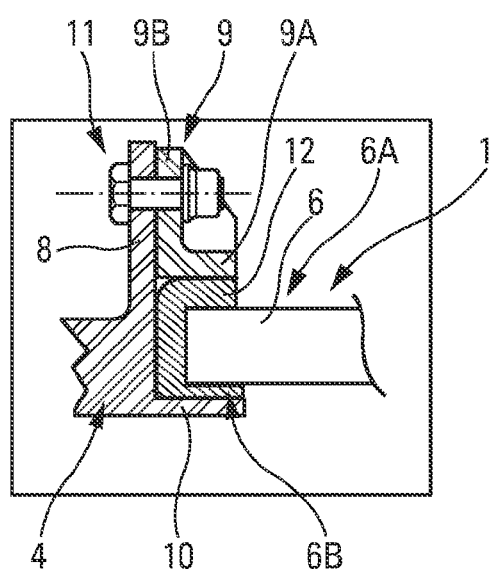
FIG. 2 is a partial schematic cross-section showing a particular embodiment of the means for fixing a support plate.

The support panel 1 is fixed to a base 8. This base 8 is rigidly connected (by any conventional means) to the primary structure formed by the bulkhead 4. It may also be directly integrated in this primary structure, as shown in FIGS. 1 and 2.

The connection plate 6 of the support plate 1 is fixed to this base 8 with the aid of at least one retaining element 9 which, in the mounting position, presses the connection plate 6 against a co-operating rim 10 provided in the region of the bulkhead 4 so that the connection plate 6 is rendered rigidly connected with the bulkhead 4 in the region of an opening (or hole) 13 provided therein. In addition, the internal periphery of the base 8 is adapted to the external periphery of the connection plate 6 (of the connection plate alone, or where appropriate of the connection plate and a sealing joint surrounding it on its periphery) so as to enable sliding of the connection plate 6 (during assembly/removal), whilst generating a peripheral contact (with a clearance) in order to participate in retaining the plate. The retaining element 9 is fixed to the base 8 by conventional fixing means 11, in particular with the aid of screws.

This particular embodiment concerning the fixing of the support plate 1 to the bulkhead 4 avoids having to drill holes in the bulkhead 4 separating the two zones Z1 and Z2 with the drawbacks which would derive therefrom in terms of sealing and mounting in particular.

The retaining element 9 is provided with two branches 9A and 9B connected together. One 9A of said branches is intended to come into contact with a face 6A of the connection plate 6 and the other branch 9B is intended to be fixed on the base 8, as shown in FIG. 2. The two branches 9A and 9B form a particular angle, and preferably a right angle in such a way as to present an L-shaped cross-section.

Thus the connection plate 6 is pressed and locked against the rim 10 with the aid of the retaining element 9.

In a preferred embodiment, the retaining element 9 is produced in a single piece. Nevertheless, in particular in order to facilitate the mounting, if necessary, said retaining element 9 can be produced as a plurality of elements (two or three elements for example).

By virtue of this mode of fixing, with the aid of one or more retaining elements 9, the support plate 1 can be installed and removed easily and quickly.

Furthermore, said support plate 1 includes at least one sealing joint 12 which is arranged on the periphery of at least one face 6A, 6B of the connection plate 6. Preferably, the sealing joint(s) are arranged at least on the face 6B of the connection plate 6 which is subject to the lower pressure, that is to say towards the non-pressurized zone Z2, in order to be retained principally by the pressure.

In a particular embodiment shown in FIGS. 1 and 2, one or more sealing joints are arranged on each side 6A, 6B of the connection plate 6 (whilst surrounding the external periphery of the plate 6) in order to improve the impermeability to air. The sealing joint or joints are preferably mounted in the region of the entire zone of contact with the rim 10 and the branch 9A. The sealing joint 12 may have a U-shaped cross-section, as shown in FIG. 2.

Furthermore, in a particular embodiment (not shown), said sealing joint is directly integrated in the connection plate 6.

Moreover, in a preferred embodiment the sealing joint 12, the connection plate 6 and the retaining element 9 are installed on the side (Z1) of the bulkhead 4 (or wall) where the mechanical stress (pressure, impact, etc.) is the greatest. Thus, the pressure difference between the zones Z1 and Z2 makes it possible to apply the connection plate 6 on the rim 10 of the bulkhead 4.

Figure 3:
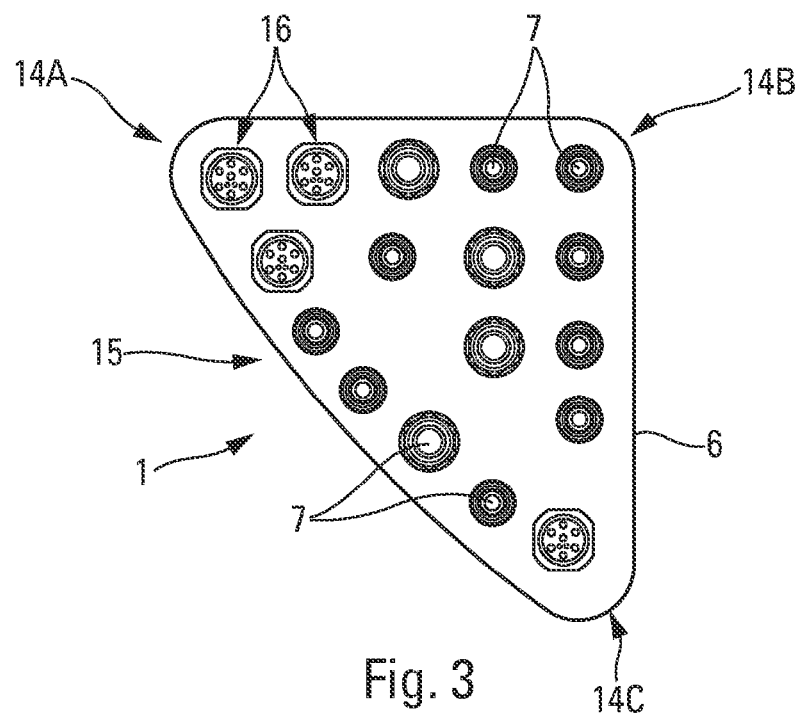
FIG. 3 is a plan view of an example of a connection plate of a support plate.

Preferably, the shape of the connection plate 6 is adapted to the shape of the bulkhead 4 in order to generate the least stress. To this end in particular it may be rectangular, circular, elliptical, etc. In a particular embodiment said connection plate 6 has a shape of a right-angled triangle with rounded summits or corners 14A, 14B, 14C and a side 15 (opposite the right angle corner 14B) which is slightly curved and which has a slightly convex shape, as shown in FIG. 3.

The shape of the connection plate 6 is adapted (and optimized) to the installation zone on the aircraft 2, as shown in FIG. 4.

In addition, the connection plate 6 is electrically conductive, and it may be produced from metal or with inserts made of a plastics material and metal.

Figure 5:
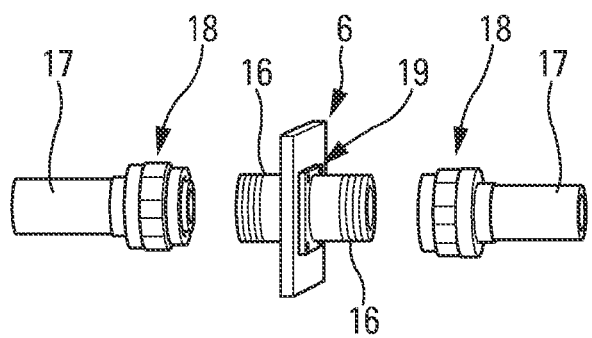
FIG. 5 shows parts which make it possible to produce a connection on a support plate.

Moreover, said support plate 1 is provided with a plurality of connectors 16. Each connector 16 is arranged so as to pass through one of said holes 7 in the connection plate 6, and is fixed to this plate 6 by conventional means 19, as shown in FIG. 5.

Conduits or cables 17 may be connected to said connectors 16, via conventional co-operating connection means 18 at the ends thereof. Thus, the device 1 is capable of creating, in the region of each connector 16, a circulation (in particular of electrical current or of fluid) from a conduit or cable 17 of the zone Z1 towards a conduit or cable 17 of the zone Z2 via the corresponding connector 16 of the support plate.

By means of the aforementioned characteristics of the support plate 1, a structural part is obtained which has a pressurization barrier function with a possibility of integration of all the systems in question.

Said support plate 1 also has in particular the following additional advantages:

it uses dry installation which results in a saving of time. As the fixing means 11 (in particular screws) retaining the retaining element 9 are arranged in the pressurized zone Z1, the corresponding drillings do not have to be sealed;

any modification of the connection plate 6 does not affect the structure of the aircraft 2;

it necessitates a single large opening 13 in the bulkhead 4 (FIG. 2) which is easier to manage than a plurality of small openings; and as the holes 7 for the connectors 16 are made outside the aircraft 2, it presents a reduced risk of contamination.

In order to install a support plate 1, such as that described above, the following operations are carried out:

the sealing joint(s) 12 is (are) arranged at least on the non-pressurized face of the connection plate 6 (provided with holes 7) or else on the structure (rim 10) of the aircraft 2. The joint(s) 12 may likewise be completely integrated in the connection plate 6;

outside the aircraft 2, all the connectors 16 for the different electrical and hydraulic systems in question are installed on the connection plate 6 (in the holes 7);

the plate 6 with the connectors 16 is inserted by sliding it along the base 8, near the pressurized zone Z1;

the retaining element(s) 9 is (are) placed on the connection plate 6 in the region of the pressurized zone Z1; and this or these retaining element(s) 9 with the fixing means 11, in particular screws, is (are) fixed on the base 8 in such a way as to press the connection plate 6 against the rim 10 in order to create a sufficient seal.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft comprising:
   a pressurized zone;
   a non-pressurized zone;
   a bulkhead separating the pressurized zone from the non-pressurized zone; and
   a support plate for the passage of systems between pressurized zone and the non-pressurized zone positioned within an opening in the bulkhead, said support plate comprising:
      a connection plate,
      said connection plate comprising at least one retaining element and at least one sealing joint arranged on the periphery of at least one face of the connection plate,
      said connection plate further comprising at least one electrical connector and at least one hydraulic connector passing through the opening in said bulkhead, and
   wherein said retaining element is provided with two branches, of which one is intended to come to contact with a face of the connection plate and of which the other is suitable for being fixed on a structural element.

2. The aircraft according to claim 1, wherein said sealing joint is arranged on a face of the connection plate which is subject to the lower pressure.

3. The aircraft according to claim 1, wherein said sealing joint has a U-shaped cross-section.

4. The aircraft according to claim 1, wherein said sealing joint is integrated in the connection plate.

5. The aircraft according to claim 1, wherein said connection plate has the shape of a right-angled triangle with rounded corners and a side opposite the right angle corner which is slightly curved with a convex shape.

6. An aircraft comprising:
   a pressurized zone;
   a non-pressurized zone;
   a bulkhead separating the pressurized zone from the non-pressurized zone;
   a support plate for the passage of systems between pressurized zone and the non-pressurized zone positioned within an opening in the bulkhead, said support plate comprising:
      a connection plate,
      said connection plate comprising at least one retaining element and at least one sealing joint arranged on the periphery of at least one face of the connection plate,
      said connection plate further comprising at least one electrical connector and at least one hydraulic connector passing through said connection plate from the pressurized zone to the non-pressurized zone, and
   wherein said retaining element is provided with two branches, of which one is intended to come to contact with a face of the connection plate and of which the other is suitable for being fixed on a structural element.

7. The aircraft according to claim 6, wherein said retaining element is fixed by one of its branches to a structural element rigidly connected to the bulkhead.

8. The aircraft bulkhead according to claim 7, wherein said structural element is a base of which the internal periphery is adapted to the external periphery of said connection plate so as to allow sliding thereof.

* * * * *